United States Patent
Chengjie

(10) Patent No.: US 8,960,682 B2
(45) Date of Patent: Feb. 24, 2015

(54) HYBRID RING WELDED CYLINDER HEAD GASKET

(71) Applicant: Federal-Mogul Corporation, Southfield, MI (US)

(72) Inventor: Sun Chengjie, Shanghai (CN)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/828,024

(22) Filed: Mar. 14, 2013

(65) Prior Publication Data

US 2014/0265153 A1 Sep. 18, 2014

(51) Int. Cl.
*F02F 11/00* (2006.01)
*F16J 15/08* (2006.01)
*F16J 15/12* (2006.01)

(52) U.S. Cl.
CPC ........... *F02F 11/002* (2013.01); *F16J 15/0818* (2013.01); *F16J 15/123* (2013.01)
USPC ........... 277/601; 277/600; 277/590; 277/591; 277/592

(58) Field of Classification Search
USPC ................. 277/590, 591, 592, 593, 600, 601
See application file for complete search history.

(56) References Cited

U.S. PATENT DOCUMENTS

| | | | |
|---|---|---|---|
| 1,782,870 A | 11/1930 | Dickson | |
| 2,034,610 A | 3/1936 | Dickson | |
| 3,519,281 A | 4/1967 | Teucher et al. | |
| 3,572,731 A | 3/1971 | Stecher | |
| 3,806,138 A | 4/1974 | Herrington | |
| 4,312,512 A * | 1/1982 | Conte et al. | 277/593 |
| 4,518,168 A | 5/1985 | Belter | |
| 4,645,217 A * | 2/1987 | Honeycutt et al. | 277/555 |
| 5,338,046 A | 8/1994 | Willis et al. | |
| 5,505,466 A | 4/1996 | Willis et al. | |
| 5,890,719 A | 4/1999 | Bettencourt | |
| 5,921,558 A | 7/1999 | Kozerski | |
| 6,093,467 A | 7/2000 | Forry | |
| 6,241,253 B1 | 6/2001 | Dempsey et al. | |
| 6,315,303 B1 * | 11/2001 | Erb et al. | 277/593 |
| 2005/0023768 A1 * | 2/2005 | Adams et al. | 277/592 |
| 2008/0007014 A1 * | 1/2008 | Foster | 277/594 |
| 2011/0042904 A1 | 2/2011 | Clemons et al. | |
| 2011/0101623 A1 | 5/2011 | Prehn et al. | |
| 2013/0241156 A1 | 9/2013 | Munekata | |

FOREIGN PATENT DOCUMENTS

EP 0208349 A2 1/1987

* cited by examiner

*Primary Examiner* — Gilbert Lee

(74) *Attorney, Agent, or Firm* — Robert L. Stearns; Dickinson Wright, PLLC

(57) ABSTRACT

A cylinder head gasket with a single layer carrier member, a sealing ring for sealing around the cylinder opening, and at least one protection layer. The sealing ring has a plurality of functional layers. A protection layer is positioned on at least one side of the sealing ring, and preferably on both sides. The sealing ring and protection layers are fixedly secured to the carrier member by welding.

7 Claims, 2 Drawing Sheets

HYBRID RING WELDED CYLINDER HEAD GASKET

TECHNICAL FIELD

The present invention relates to cylinder head gaskets, particularly high performance gaskets which are less expensive.

BACKGROUND

Cylinder head gaskets are in common use today, particularly for diesel engines for heavy duty vehicles, such as trucks. Diesel engines create significant pressures in the cylinders and require robust sealing systems to prevent leakage and gasket failures. Gasket failures can include, for example, compression losses and exhaust gases being forced into the cooling system, leading to engine overheating and engine wear.

Several known cylinder head gaskets seal and operate satisfactorily but are too expensive for some vehicles, engines or programs. These gaskets include a three layer carrier with a cylinder ring sealing member and elastomeric sealing members positioned around the openings for the coolant passages, push rods and oil passages. The three full layers for the carrier include a cold rolled steel layer and two layers of stainless steel.

There is a need for a cylinder head gasket which operates and performs as well as current gaskets, but which is less expensive. Thus, an object of the present invention is to provide a gasket to fulfill that need.

SUMMARY OF THE INVENTION

A preferred embodiment of the present invention includes a one layer carrier which is made from a single plate, and a multi-layer sealing ring which mates with the carrier to seal the cylinder opening. The sealing ring includes annular rings of two or three functional layers of sealing members which are positioned around the cylinder opening in the carrier. Two protection layers are positioned on the sealing ring, one on each side, and secure the sealing ring to the carrier. Tabs on the protection layers which protrude radially outwardly of the functional layers are spot welded together through openings in the sealing ring layers. This secures all of the components together completing the unique cylinder head gasket.

Elastomeric sealing beads are also formed by molding on the carrier to seal the openings for passage of coolant and oil, and for positioning of the valve push rods. The sealing beads are formed to extend transversely from both sides of the carrier, as well as radially into the openings.

Other functions and benefits of the invention will become apparent from the following description of embodiment of the invention when viewed in accordance with the attached drawings and appended claims.

BRIEF DESCRIPTION OF THE DRAWINGS

These and other features and advantages of the present invention will become more readily appreciated when considered in connection with the following detailed description and appending drawings, wherein.

DESCRIPTION OF THE PREFERRED EMBODIMENTS

Figure 1:
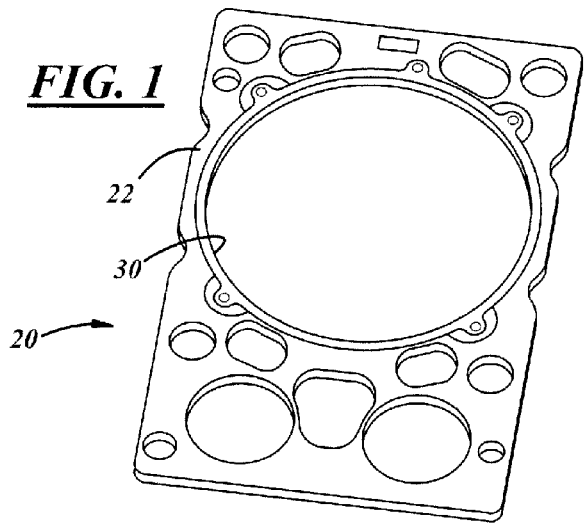
FIG. 1 is a perspective view of a cylinder head gasket in accordance with a preferred embodiment of the invention.
Figure 2:
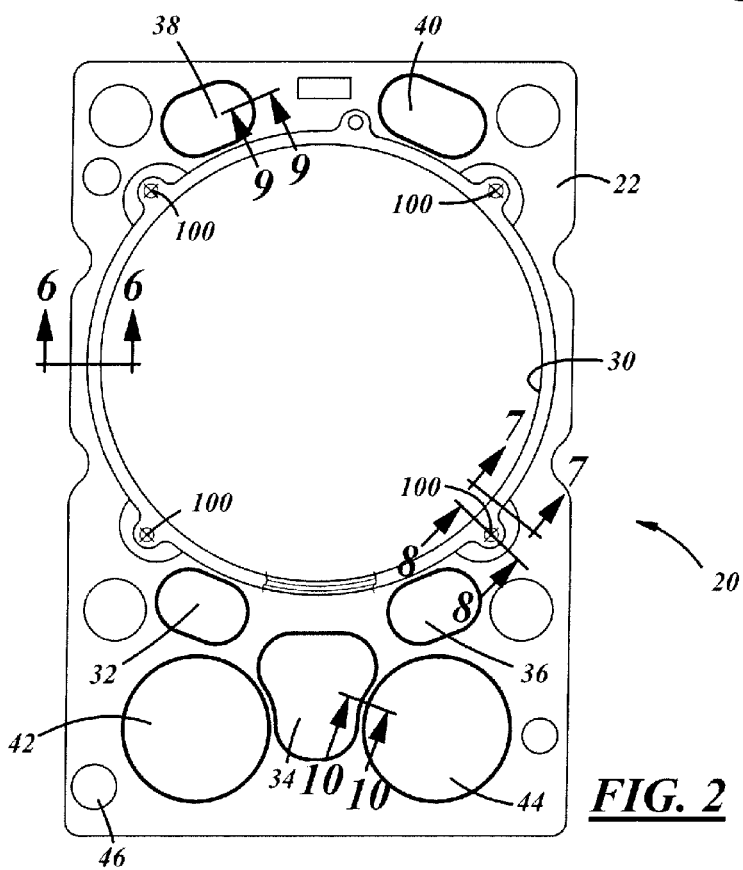
FIG. 2 is an elevational view of a cylinder head gasket in accordance with a preferred embodiment of the invention.

A perspective view of a preferred embodiment of the cylinder head gasket invention is depicted in FIG. 1. An elevational view of that embodiment is shown in FIG. 2.

Figure 3:
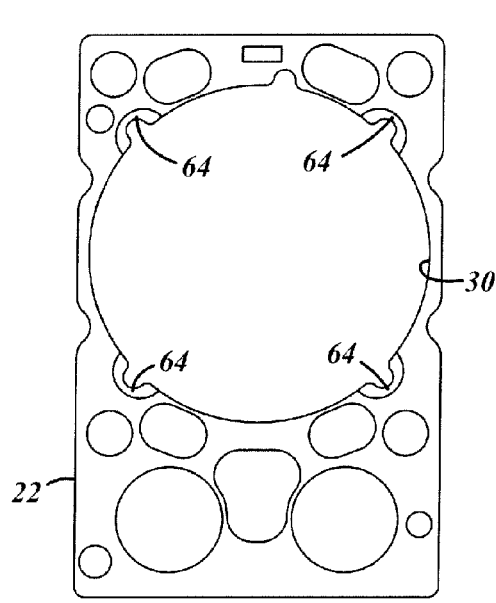
FIG. 3 is an elevational view of a carrier member for use as a component in the gasket as shown in FIG. 2.
Figure 4:
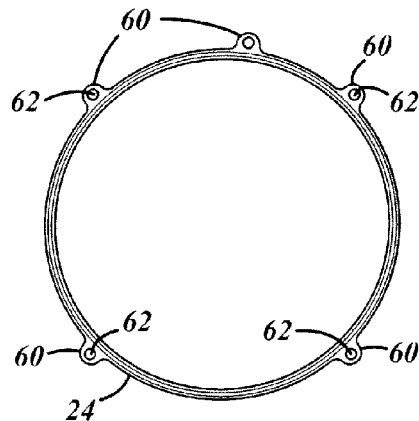
FIG. 4 is an elevational view of a sealing ring member for use as a component in the gasket as shown in FIG. 2.
Figure 5:
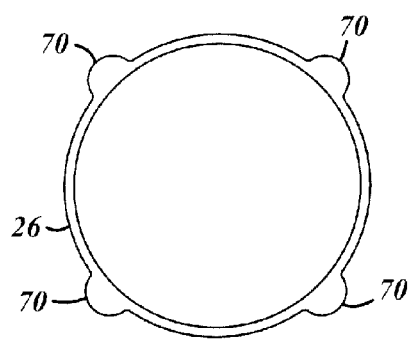
FIG. 5 is an elevational view of a protection layer for use as a component in the gasket as shown in FIG. 2.

FIGS. 3, 4 and 5 are separate elevational views of the main components of the cylinder head gasket, namely the carrier member 27, the functional annular sealing ring 24, and one of the annular protection layer members 26, respectively. FIGS. 6-10 are cross-sectional views taken along lines A-A, B-B, C-C, D-D, and E-E, respectively, in FIG. 2.

The carrier member 22 is a single plate layer of a cold rolled steel material. The carrier member has a plurality of openings formed in it, such as cylinder openings 30 for the piston member, coolant openings 32, 34, 36, 38 and 40 for coolant to pass through during passage through the engine, openings 42 and 44 to allow movement of the engine push rods, and opening 46 for passage of high pressure oil.

It is to be understood that the shape, structure and number and function of openings of the gasket member 20 shown in the drawings is exemplary. The gasket can have a wide variety of sizes, shapes and openings to fit different engines. As well known, the cylinder head gasket is mounted between the engine block and engine manifold in an engine and its purpose is to seal the joint between these two structures and prevent leakage of the combustion gases and materials, such as the engine coolant and the engine oils, between them. Most cylinder head gaskets include openings, for example, for engine coolant, push rods and engine oil, although the openings could have different functions, locations and sizes than the openings in the embodiment shown in the drawings. In addition, alternate embodiments of a cylinder head gasket could have a sufficient size and extended configuration to seal around two, three or more cylinders at the same time. With such an embodiment, the carrier member would have a series of structures like the one shown in FIG. 2 positioned side by side and integrally formed as a one piece stamping.

The sealing ring 24 has a circular annular shape and when mated with the carrier member, is positioned in the central cylinder opening 30. The sealing ring has a plurality of layers. In the embodiment shown in the drawings, the ring 24 has three layers which are called "functional" layers 50. The three functional layers are preferably made of a stainless steel material.

In other embodiments of the invention, the annular sealing ring can have a different number of layers, such as, for example, one, two, four, five, etc. The number of layers included depends on a number of factors, such as, for example, the size and type of engine and the pressures and heat caused by the fuel combustion in the cylinder.

The protection layers 26 are made of a stainless steel material and are positioned on both sides of the sealing ring.

Figure 6:
FIG. 6 is a cross-sectional view taken along line A-A in FIG. 2.

A cross-sectional view of the sealing ring member 24 and protection layer 26 are shown in FIG. 6. This cross-section is taken along line A-A in FIG. 2. As depicted, the annular body of the layers of the sealing ring 24 is positioned inside the cylinder opening 30 and in planar alignment with the plane of the carrier member.

The sealing ring layers also have a plurality of tab members 60 positioned around their periphery. The tab members have openings 62 therein and when the sealing ring is positioned in the opening 30 in the carrier member 22, the tab members mate with recesses 64 in the carrier member. See FIG. 3.

After the sealing ring is properly positioned in the opening 30 in the carrier member 22, a protection ring layer 26 is positioned on each side of the sealing ring member 24 to form the gasket structure 20 as shown in FIG. 2. Each of the protection ring members 26 has a plurality of tab members 70 on the periphery thereof, as shown in FIG. 5. These tab members are also located and positioned in recesses 64 in the carrier member 27 when the gasket is assembled.

Figure 7:
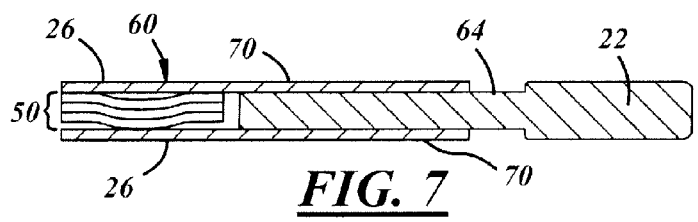
FIG. 7 is a cross-sectional view taken along line B-B in FIG. 2.
Figure 8:
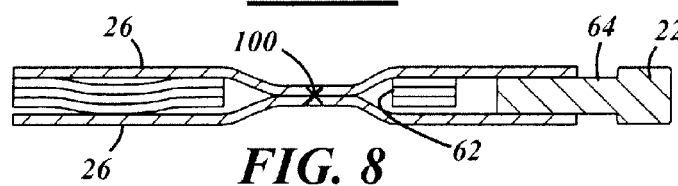
FIG. 8 is a cross-sectional view taken along line C-C in FIG. 2.

FIGS. 7 and 8 are cross-sectional views taken along lines B-B and C-C, respectively, in FIG. 2. FIG. 7 depicts the positioning of the tab members 60 and 70 in the recesses 64. As indicated in FIG. 7, the planes of the recesses 64 are physically recessed from the plane of the rest of the carrier member 22. This allows the tab members 70 of the protection layers 26 to overlap and extend radially outward past the ends of the tab members 60 of the sealing ring.

After the three components 22, 24, 26 are assembled together in the manner shown in FIGS. 2 and 7, the protection layers 26 are spot welded together in the openings 62 in the tabs 60 of the sealing ring 24. This is shown in FIG. 8 which is a cross-sectional view taken along line C-C in FIG. 2. Referring back to FIG. 2, there are four spot welds 100 used in the cylinder head gasket embodiment 22 in order to fix and hold the components together.

In the embodiment shown in the drawings, there are five tab members 60 and four tab members 70 provided. The number and placement of these tab members on the components is exemplary and a different number and placement of the tab members can be provided. In the same manner, a different number and different placement of the corresponding recesses in the carrier member could also be provided. Moreover, the number and placement of the spot welds will depend on the number and location of the tabs and recesses.

Figure 9:
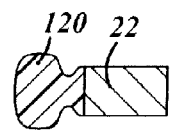
FIG. 9 is a cross-sectional view taken along line D-D in FIG. 2.
Figure 10:
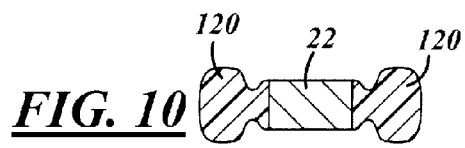
FIG. 10 is a cross-sectional view taken along line E-E in FIG. 2.

The openings 32, 34, 36, 38, 40, 42, 44 and 46 all preferably have elastomeric sealing materials positioned on them in order to seal the openings between the engine block and manifold and to prevent leakage. FIGS. 9 and 10 are cross-sections taken along lines D-D and E-E, respectively, in FIG. 2. The sealing members 120 are preferably molded on the carrier member 22 around each of the openings.

As shown in FIGS. 9 and 10, the sealing members 120 form beads of sealing material that are positioned on the inside edges of the openings and extend radially inwardly into the opening as well as project transversely outwardly on both sides of the carrier member 22. The sealing members 120 shown in FIGS. 9 and 10 are representative of the sealing members positioned around all of the openings 32, 34, 36, 38, 40, 42, 44, and 46.

The sealing members 120 provide tight and secure seals around the openings when the engine block and manifold are assembled together.

Although the invention has been described with respect to preferred embodiments, it is to be also understood that it is not to be so limited since changes and modifications can be made therein which are within the full scope of this invention as detailed by the following claims.

What is claimed is:

1. A cylinder head gasket comprising:
    a one-layer carrier member, said carrier member having a cylinder opening and a plurality of other openings, an annular sealing ring positioned in said cylinder opening, said sealing ring comprising a plurality of annular functional layers and a pair of annular protection layers, one of said protection layers positioned on either side of said sealing ring;
    a plurality of recess members in said carrier member positioned around the periphery of said cylinder openings, and a corresponding plurality of first radially extending tab members positioned on said functional layers, and a plurality of second radially extending tab members positioned on said protection layers, said first and second tab members being positioned in said recesses; and
    said first tab members have openings therein;
    wherein said tab members are spot welded together through said openings.

2. The cylinder head gasket as described in claim 1 wherein said first and second tab members are securely connected to said recess members.

3. The cylinder head gasket as described in claim 2 wherein said tab members are spot welded together to secure said sealing ring and protection layers to said carrier member.

4. The cylinder head gasket as described in claim 1 wherein three functional layers are provided.

5. The cylinder head gasket as described in claim 1 further comprising a plurality of additional openings in said carrier member, and elastomeric sealing members positioned around each of said additional openings.

6. The cylinder head gasket as described in claim 5 wherein said sealing members extend radially inwardly in said openings and protrude transversely outwardly on both sides of said carrier member.

7. The cylinder head gasket as described in claim 1 wherein said annular protection layers are substantially the same size and shape as said annular sealing ring.

* * * * *